United States Patent [19]

Stockberger et al.

[11] Patent Number: 5,020,012
[45] Date of Patent: May 28, 1991

[54] METHOD AND APPARATUS FOR MATCHING MENU LABELS WITH KEYS

[75] Inventors: Randall L. Stockberger; Christopher M. Bunsen, both of Corvallis, Oreg.

[73] Assignee: Hewlett Packard Company, Palo Alto, Calif.

[21] Appl. No.: 590,451

[22] Filed: Sep. 25, 1990

Related U.S. Application Data

[63] Continuation of Ser. No. 285,841, Dec. 15, 1988, abandoned.

[51] Int. Cl.$^5$ ............................................. G06F 3/00
[52] U.S. Cl. ............................................. 364/709.14
[58] Field of Search ................. 364/709.14, 710.05; 341/22, 23; 340/711, 712

[56] References Cited

U.S. PATENT DOCUMENTS

| | | | |
|---|---|---|---|
| 4,078,257 | 3/1978 | Bagley | 364/900 |
| 4,354,260 | 10/1982 | Planzo | 364/709.15 X |
| 4,481,598 | 11/1984 | Ishiwata | 364/710.14 |
| 4,634,970 | 1/1987 | Payne et al. | 340/720 X |
| 4,647,911 | 3/1987 | Maegawa et al. | 364/709.14 X |
| 4,667,299 | 5/1987 | Dunn | 364/708 |
| 4,680,729 | 7/1987 | Steinhart | 364/900 |
| 4,712,105 | 12/1987 | Köhler | 340/365 S X |
| 4,718,029 | 1/1988 | Morino et al. | 364/710.08 X |
| 4,821,228 | 4/1989 | Wickes et al. | 364/710.05 X |
| 4,823,311 | 4/1989 | Hunter et al. | 364/900 |

*Primary Examiner*—Dale M. Shaw
*Assistant Examiner*—Tan V. Mai

[57] ABSTRACT

The method comprises displaying menu labels (28) on a display screen (30) in proximity to an adjacent row (34) of keys of a keyboard (22), defining keys within the row (34) to match the menu labels (28), and displaying an annunciator (42) on the display screen (30) between each menu label displayed and matched key to indicate the matching of the label with key. To further assist the user in selecting the desired key, keys within the row (34) that are not matched are disabled and an error annunciator (44) appears if an unmatched key is pressed. Alternatively, unmatched keys may be allowed to execute functions not related to the displayed menu labels. The apparatus for accomplishing the method is included within a calculator (20) and comprise a programmed microprocessor (14), a top row (34) of keys for executing the labeled functions, and an LCD display screen (30) for displaying the menu labels (28) and annunciators (42, 44).

14 Claims, 2 Drawing Sheets

METHOD AND APPARATUS FOR MATCHING MENU LABELS WITH KEYS

CROSS REFERENCE TO RELATED APPLICATION

This application is a continuation of U.S. application Ser. No. 07/285,841, filed Dec 15, 1988, now abandoned.

BACKGROUND OF THE INVENTION

This invention generally relates to calculators and computing devices that employ menus and, more particularly, to the presentation of menu displays that define the functions of keys.

Prior calculators and portable computers such as the Hewlett-Packard 19B and 28S have employed menu displays that dynamically define the functions of an adjacent set or row of keys. The menu display typically includes a number of menu choices or labels that define functions. Each menu label is displayed in a label field aligned with an underlying key. When a menu is selected and the menu labels displayed, the keys within the adjacent row are redefined to match the functions of the aligned menu labels. Pressing a matched key then executes the label function.

The required alignment of the label field with the matched key, however, places an undesirable constraint on the length and location of the field. So as not to confuse the user, the field must not overlap several keys. But such a short field severely limits the number of characters that can describe the function. In prior devices that have ignored this limitation and have overlapped keys, the user often must count the number of fields from the display edge to determine the matched key.

The present invention removes this constraint on the size and location of the label field and yet clearly communicates to the user the key matched to the label.

SUMMARY OF THE INVENTION

An object of the invention, therefore, is an improved method and apparatus for matching menu labels displayed on a display screen with keys that execute the functions of the labels.

Another object of the invention is to remove the need for the user to visually align the menu label and matched key.

Yet another object of the invention is to remove constraints on the size and location of menu label fields while preserving the matching of fields with keys.

Still another object of the invention is to alert the user if he presses a key not matched with a menu label.

In accordance with the objects, a method of matching menu labels with keys comprises displaying menu labels in proximity to a set of keys, redefining the keys within the set to match the menu labels, and displaying an annunciator between each menu label and matched key to indicate to the user the matching of label with key.

To further assist the user in selecting the desired key, each key within the set which is not matched by annunciator to a menu label may be disabled and rendered inactive. If an inactive key is mistakenly pressed, an error annunciator may be displayed to advise the user of his mistake. Alternatively, an unmatched key may be allowed to execute the function normally executed when the key is pressed.

With this method and the accompanying apparatus, menu labels of variable length may be employed to describe the underlying functions. Labels that overlap several keys within the set will not confuse the user because the annunciator indicates which of the several keys is matched with the menu label.

The foregoing and other objects, features, and advantages of the invention will become more apparent from the following detailed description of a preferred embodiment which proceeds with reference to the accompanying drawings.

DETAILED DESCRIPTION

Figure 1:
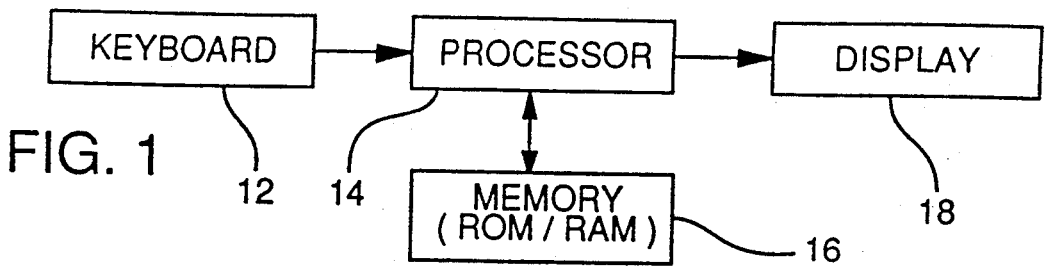
FIG. 1 is a block diagram of a conventional computer or calculator system.

Referring now to the drawings, FIG. 1 is a block diagram of a conventional computer system employed by computing devices and calculators. This system includes an electronic keyboard 12 that communicates with a processing means such as a microprocessor 14 to transmit input data and instructions. The microprocessor 14 communicates with memory 16 in which is stored computer programs for operating the computer system and for carrying out applications. The menu displays to be described are generated in response to the programmed action of the microprocessor 14 in a manner well understood in the art. Memory 16 may include either or both RAM (random access memory) and ROM (read only memory), depending upon the nature of the system. The output of the microprocessor 14 is transmitted to a display means such as the display screen 18. Examples of such display screens include a video terminal or an LED or LCD screen in a calculator.

Figure 2:
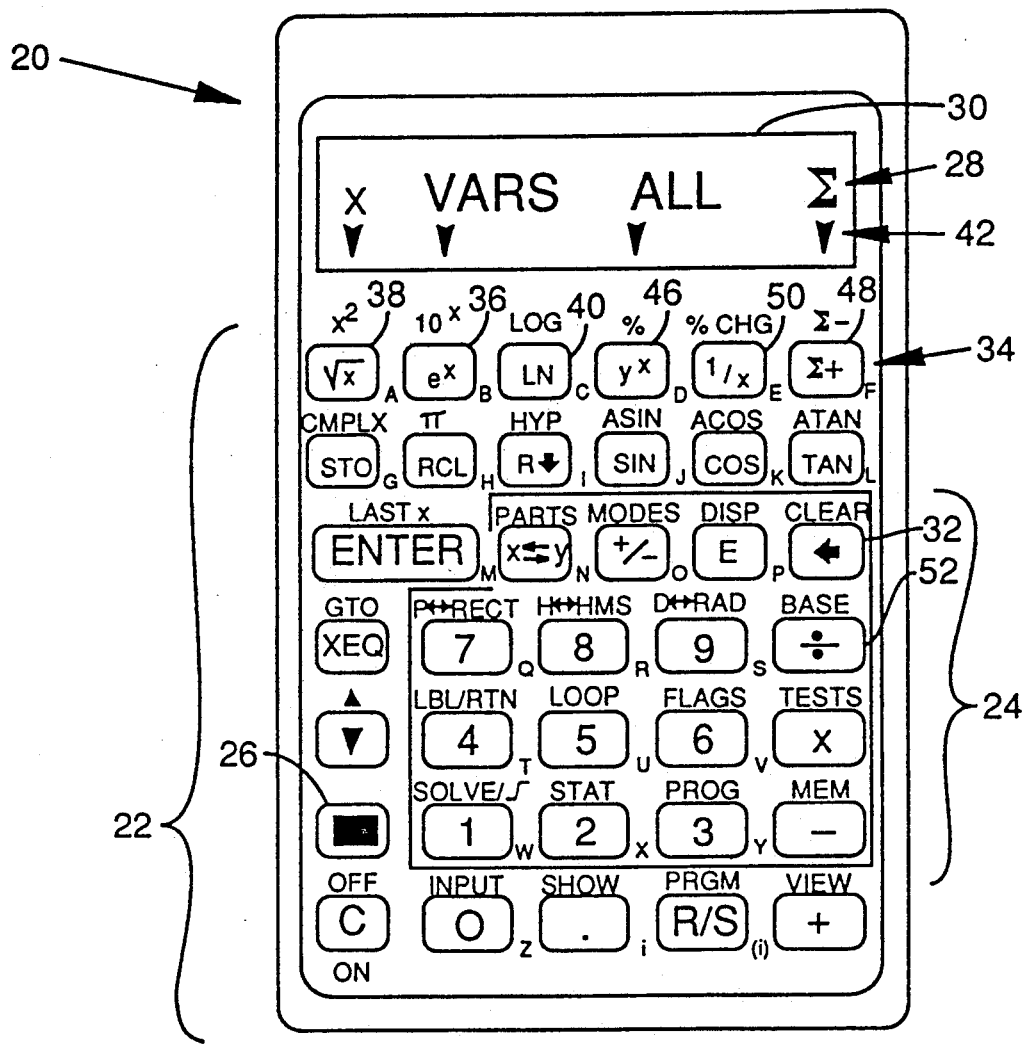
FIG. 2 is a front view of a calculator employing the present invention.

FIG. 2 is a front view of a calculator 20 that includes the apparatus and method of the present invention. On the face of the calculator 20 is a keyboard 22 that includes a plurality of menu keys 24 (within the indicated box) and a shift key 26. With the calculator turned on, pressing the shift key 26 and then one of the menu keys 24 displays a menu display comprising menu labels 28 on means such as an LCD display screen 30 of conventional design. The menu labels displayed comprise the menu printed on the keyboard above the pressed key. For example, the menu labels 28 in the present example (x, VARS, ALL, $\epsilon$) comprise the menu CLEAR associated with key 32.

Upon invoking a menu by pressing a menu key 24, a set of keys such as the row 34 in proximity to the display screen 30 are redefined from their normally indicated functions to match the functions of the menu labels. For example, key 36 has a primary function of providing $e^x$, a shifted function of providing $10^x$ and a third function of providing a storage variable B for storing data or program instructions. With the menu CLEAR invoked, however, key 36 is redefined to match the menu label VARS. Pressing key 36 as redefined will execute the function associated with VARS, namely, clearing the data or instructions stored in all storage variables. Of course, in a calculator other than that illustrated, keys of row 34 may not have other functions and would simply be defined when a menu is invoked.

Unlike label fields in prior calculator and computer systems, the display fields of labels 28 on display screen 30 are unconstrained in size or location relative to the keys of row 34. These fields, if desired, can cover the length of screen 30. Label x, for example, is a single character field having the letter x aligned with key 38 while label VARS is a four character field having the letter V aligned with key 36 and the letter S roughly aligned with key 40. The menu labels such as VARS and ALL need not be aligned with a single key but can occupy several adjacent LCD pixels and thus overlap several keys because of indicating means such as arrow annunciators 42. Means such as the display screen 30 displays these annunciators between each menu label 28 and the matched key of row 34 to indicate which of the several keys is matched to the overlapping label. Each menu label can thus be of a variable length sufficient to communicate its function without confusing the user as to which key is matched to which label. The user need only follow the arrow annunciator 42 from label to key, such as the annunciator between the letter V and key 36. In the illustrated embodiment, the menu labels overlap matched keys, but such an overlapping relationship is not required. If desired, LCD pixels could be provided such that an arrow annunciator 42 could be displayed that points between a nonaligned label and key, such as between VARS and key 38.

Figure 3:
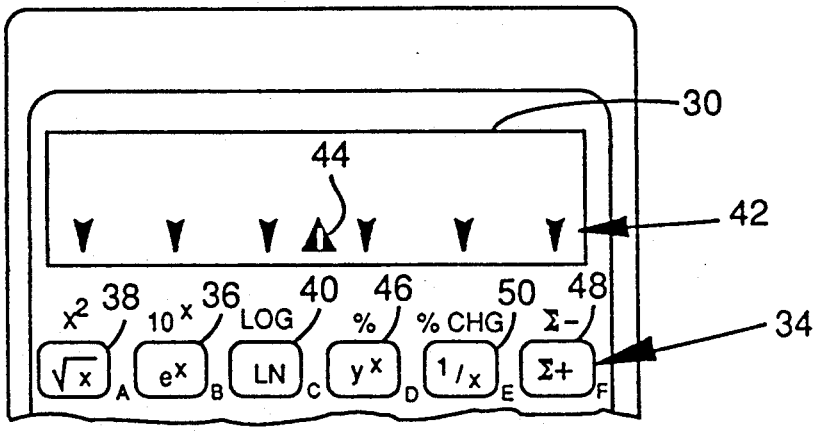
FIG. 3 is a partial front view of the calculator of FIG. 2 illustrating the annunciators displayed in the invention.

FIG. 3 is a front view of a portion of calculator 20 showing the LCD pixels for defining arrow annunciators 42 that can be displayed on the display screen 30 and for an error annunciator 44 that is also displayed on the screen in circumstances to be described. Invisible until voltage is applied to the defining LCD pixels, an arrow annunciator 42 may thus appear above any of the keys of row 34. Which annunciators 42 appear depend upon which keys are active for the chosen menu. For example, for the menu CLEAR shown in FIG. 2, keys 38, 36, 46 and 48 are active and matched to the respective menu labels. Arrow annunciators 42 appear between each of these keys and menu labels, while no annunciators appear above keys 40 and 50. Other menus such as BASE (which displays labels for choosing the base of the number system) use keys 38, 40, 46, and 48. If the menu BASE were invoked by pressing the menu key 52, labels DEC, HX, OC and BN would appear on display screen 30 and annunciators 42 would appear between these labels and keys 38, 40, 46 and 48, respectively.

In the illustrated embodiment, the keys in row 34 that do not match a displayed menu label are disabled and are therefore inactive. Pressing an inactive key such as key 40 in FIG. 2 causes error annunciator 44 to appear as long as the key is pressed. The annunciator 44 indicates to the user that the key does not match a menu label, even if a label appears above the key, such as the letter S in VARS. The error annunciator 44 is also displayed if keys outside of row 34 are pressed when menu lables are displayed (except for specific clearing keys that clear the menu display from screen 30).

In an alternative embodiment, the unmatched keys may be allowed to execute the function normally executed when the key is pressed. For example, pressing key 40 in FIG. 2 could provide the natural log of the last number entered before the menu CLEAR was invoked. An unmatched key could also be programmed to clear the display if pressed or execute other functions not related to the displayed menu labels. In such circumstances, the error annunciator 44 would not be displayed.

Processing means such as programmed microprocessor 14 are provided for generating the various menu labels 28 and arrow annunciators 42 and for redefining the keys of row 34 to match the menu labels 28. The microprocessor also is programmed to disable the unmatched keys of row 34 and to generate the error annunciator 44 when an inactive (unmatched or otherwise nonresponsive) key is pressed.

Figure 4:
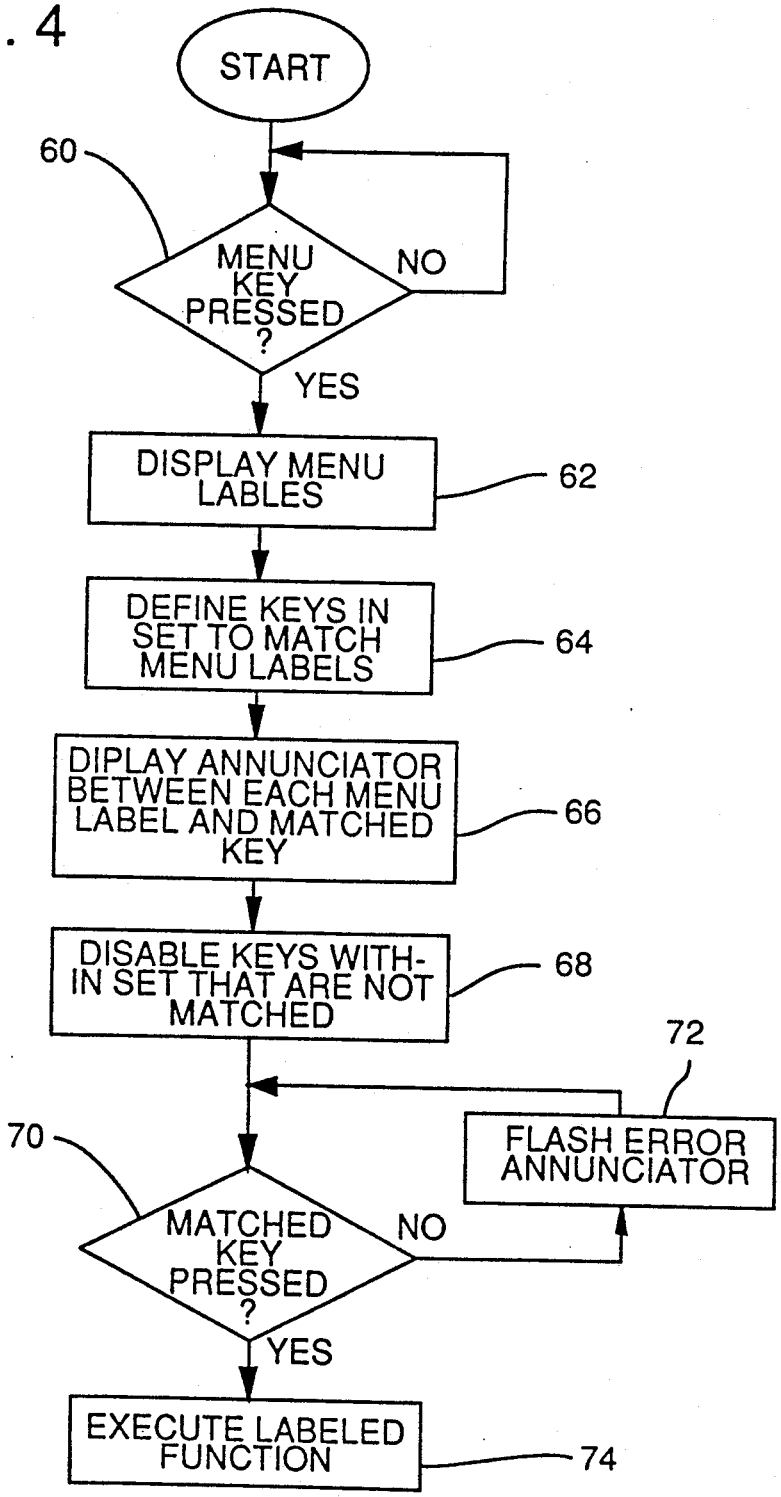
FIG. 4 is a flowchart illustrating the method of matching menu labels to keys.

FIG. 4 illustrates the steps (referenced by numerals in parenthesis) carried out by the microprocessor 14 in matching menu labels to keys. The microprocessor acts in response to an interrupt when one of the plurality of menu keys 24 is pressed to select a menu (60). In responding, the microprocessor displays the menu labels 28 of the selected menu (62) on screen 30 in proximity to the row 34 of keys and redefines the keys of row 34 as required to match the label functions (64). It also displays an arrow annunciator 42 between each menu label 28 and matched key (66) to indicate the matching of label with key. It further disables keys in row 34 that are not matched (68) by an annunciator 42 to a menu label. The display screen at this point has the appearance shown in FIG. 2. As described, most of the other keys of keyboard 22 are also disabled and hence inactive so long as the menu labels are displayed.

The microprocessor 14 now looks for the pressing of a matched key (70) in row 34. If an inactive key in row 34 (one not matched to a menu label and disabled) is pressed by mistake, the error annunciator 44 is displayed (72) to advise the user of his mistake. When a matched key is pressed, the microprocessor executes the corresponding labeled function (74). If one of the clearing keys is pressed (not shown in FIG. 4), the display screen 30 is cleared of the menu display.

The microprocessor 14 may alternatively be programmed not to disable unmatched keys, but to allow them to execute functions not related to the displayed menu labels. In such circumstances, the error annunciator 44 would not be displayed.

It will be recognized by those skilled in the art that the elements of the illustrated embodiment are but one means for carrying out the invention and the many functionally equivalent structures may be employed to the same end. For example, the invention will work as well with other display technologies, including but not limited to CRTs with raster scan or gas-plasma display devices. The annunciators may be audio if desired and may be of any shape or size. The programmed microprocessor could also be replaced with other computing means or even with hard-wired logic if desired.

Having illustrated and described the principles of the invention in a preferred embodiment, it should be apparent to those skilled in the art that the invention can be modified in arrangement and detail without departing from such principles. We claim all modifications coming within the spirit and scope of the following claims.

We claim:

1. A method of uniquely associating menu labels with corresponding keys, comprising:
   displaying upon display means menu labels (28) in proximity to a set (34) of keys;
   defining keys within the set (34) to execute procedures associated with the menu labels (28); and displaying upon said display means an annunciator (42) between each menu label displayed and a key defined to execute a procedure associated therewith to unambiguously indicate the association of label with key;

wherein the menu labels are unconstrained in size and location relative to the keys corresponding thereto.

2. The method of claim 1 including disabling each key within the set which is not associated by an annunciator with a menu label.

3. The method of claim 2 including displaying an error annunciator if a key not associated with a menu label is pressed.

4. The method of claim 1 wherein the menu labels (28) displayed are of variable lengths.

5. The method of claim 1 wherein at least one of the menu labels displayed overlaps several keys within the set and the annunciator indicates which of the several keys is associated with the overlapping menu label.

6. The method of claim 1 including selecting a menu from a plurality of menus (24), each menu displaying menu labels (28) above the set (34) of keys.

7. Apparatus for uniquely associating menu labels with corresponding keys, comprising:
    a set (34) of keys;
    means (30) for displaying upon a display device menu labels (28) in proximity to the set (34) of keys;
    means (14) for defining keys within the set (34) to execute procedures associated with the menu labels (28); and
    means (30) for displaying upon the display device an annunciator (42) between each menu label displayed and a key defined to execute the associated procedures to unambiguously indicate the association of label with key;
    wherein the menu labels are unconstrained in size and location relative to the keys corresponding thereto.

8. The apparatus of claim 7 including means for disabling each key within the set which is not associated by an annunciator with a menu label.

9. The apparatus of claim 8 including means for displaying an error annunciator if a key not associated with a menu label is pressed.

10. The apparatus of claim 7 wherein the means (30) for displaying menu labels (28) is constructed to display labels that overlap several keys within the set (34).

11. Apparatus for associating menu labels with keys, comprising:
    a set (34) of keys;
    processing means (14) for generating menu labels (28) and annunciators (42, 44) and for defining keys within the set (34) to execute procedures associated with the menu labels (28); and
    display means (30) for displaying on a display device selected menu labels (28) adjacent the set (34) of keys and for displaying an annunciator (42) between each menu label displayed and a key defined to execute an associated procedure to unambiguously indicate the association of label with key;
    wherein the menu labels are unconstrained in size and location relative to the keys corresponding thereto.

12. The apparatus of claim 11 wherein the processing means includes means for disabling each key within the set which is not associated by an annunciator with a menu label.

13. The apparatus of claim 12 wherein the display means is constructed for displaying an error annunciator if a key not associated with a menu label is pressed.

14. The apparatus of claim 11 wherein the display means (30) is constructed for displaying menu labels (28) that overlap several keys within the set (34).

* * * * *